US006928641B1

(12) United States Patent
Szewerenko et al.

(10) Patent No.: US 6,928,641 B1
(45) Date of Patent: Aug. 9, 2005

(54) METHOD AND SYSTEM FOR FAR BRANCH AND CALL INSTRUCTIONS

(75) Inventors: Leland Szewerenko, Pittsburgh, PA (US); David A. Syiek, Pittsburgh, PA (US); Robert Cyran, Delmont, PA (US)

(73) Assignee: Texas Instruments Incorporated, Dallas, TX (US)

( * ) Notice: Subject to any disclaimer, the term of this patent is extended or adjusted under 35 U.S.C. 154(b) by 770 days.

(21) Appl. No.: 09/604,113

(22) Filed: Jun. 26, 2000

Related U.S. Application Data

(60) Provisional application No. 60/158,248, filed on Oct. 8, 1999.

(51) Int. Cl.[7] .............................................. G06F 9/44
(52) U.S. Cl. ..................................... 717/159; 717/162
(58) Field of Search ........................ 709/331; 711/170; 712/238; 717/151–159, 162, 163, 136–137, 717/128, 140, 147, 150, 170, 174

(56) References Cited

U.S. PATENT DOCUMENTS 5,475,840 A * 12/1995 Nelson et al. .............. 709/331
5,740,447 A * 4/1998 Kurahashi ................... 717/159
5,784,605 A * 7/1998 Ando .......................... 712/238
5,797,014 A * 8/1998 Gheith ........................ 717/163
5,835,958 A * 11/1998 Long et al. .................. 711/170
5,857,105 A * 1/1999 Ayers et al. ................. 717/144
6,223,339 B1 * 4/2001 Shah et al. .................. 717/158
6,317,870 B1 * 11/2001 Mattson, Jr. ................ 717/151

OTHER PUBLICATIONS

Intel, "IA-64 Sotware Conventions and Runtime Architecture Guide", Aug. 1999.*
Hollingsworth et al., "Dynamic Program Instrumentation for Scalable Performance Tools", May 1994, pp. 1-10.*

* cited by examiner

Primary Examiner—Anil Khatri
Assistant Examiner—Tuan Anh Vu
(74) Attorney, Agent, or Firm—W. James Brady, III; Frederick J. Telecky, Jr.

(57) ABSTRACT

The present invention provides a method for far branch and call instructions. The present invention includes the link-time modification of object code generated by the compiler or assembler and the addition of custom generated object code to the link for the purpose of implementing far branches and calls without changing the compiler generated instructions or expanding compiler generated object code.

5 Claims, 12 Drawing Sheets

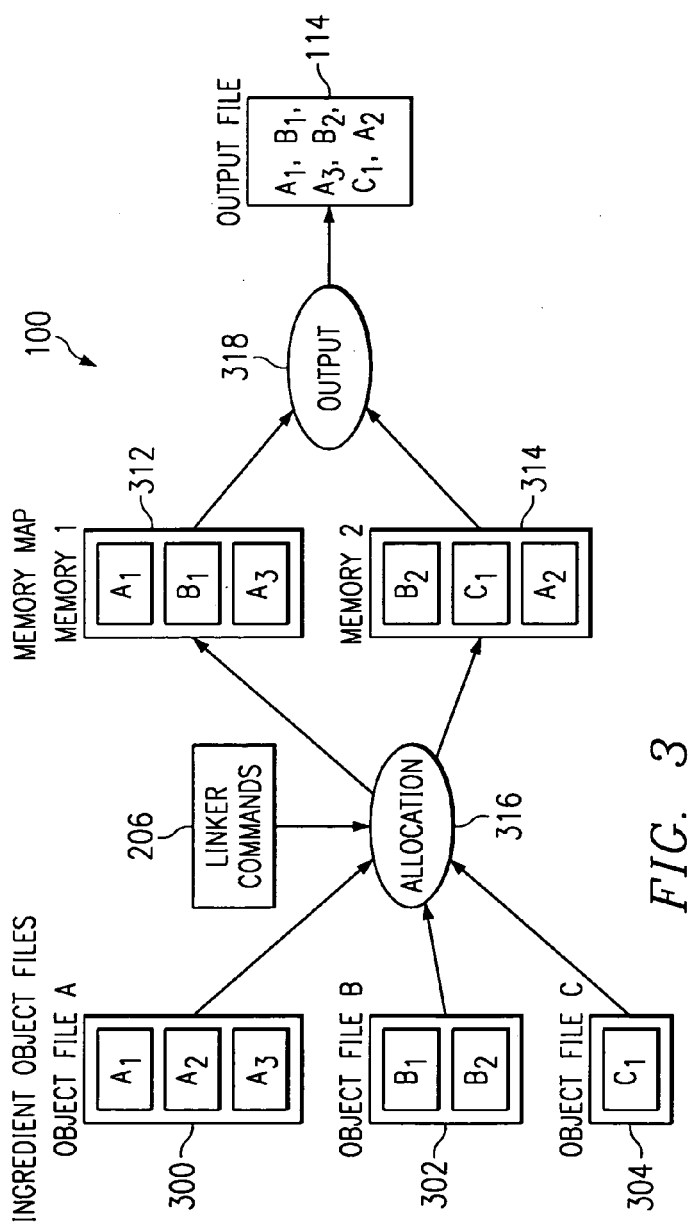
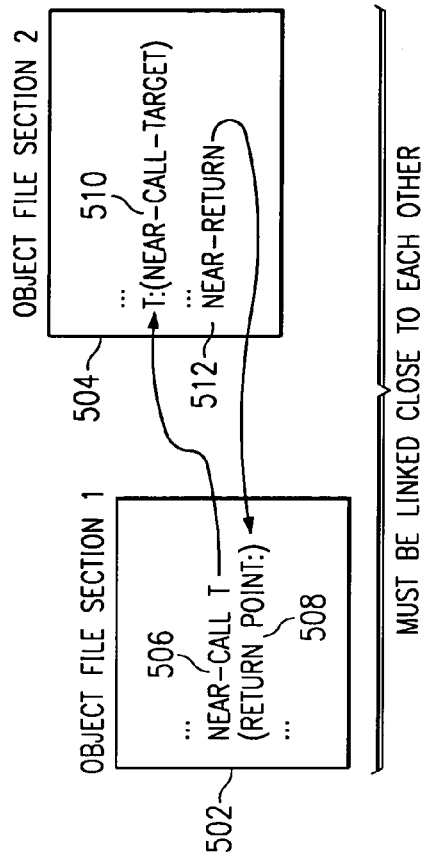
FIG. 3
FIG. 6

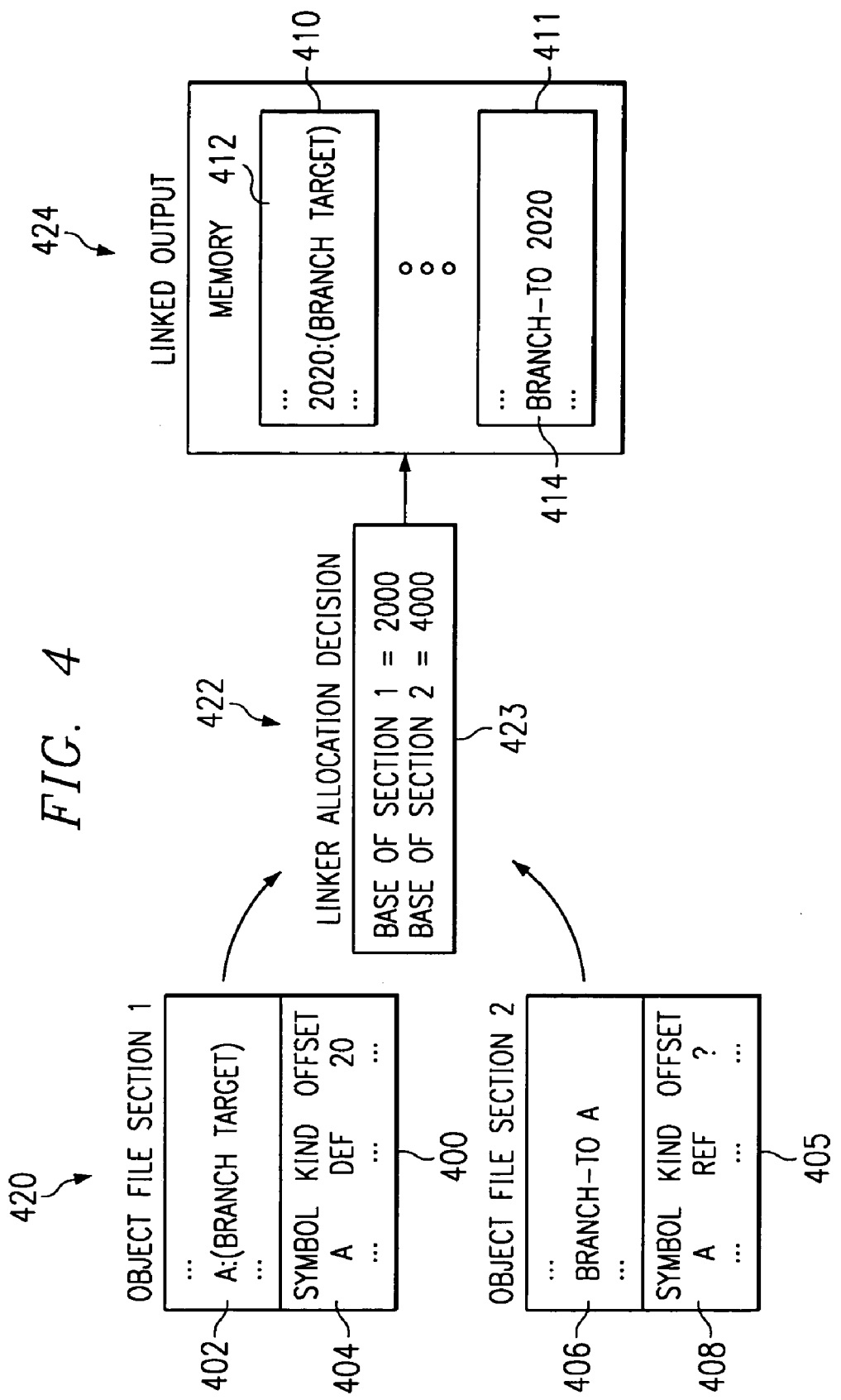

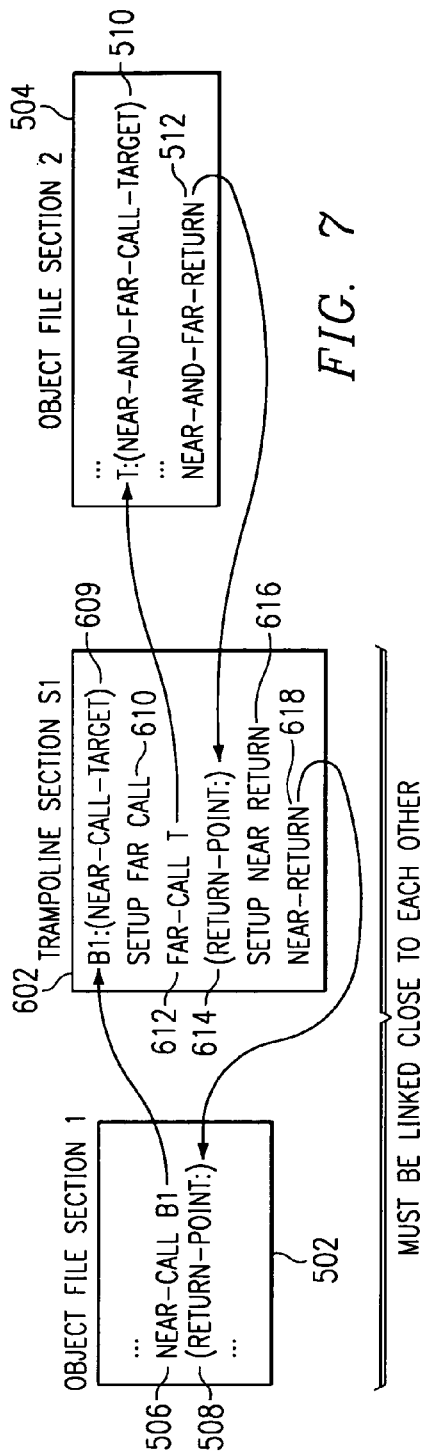
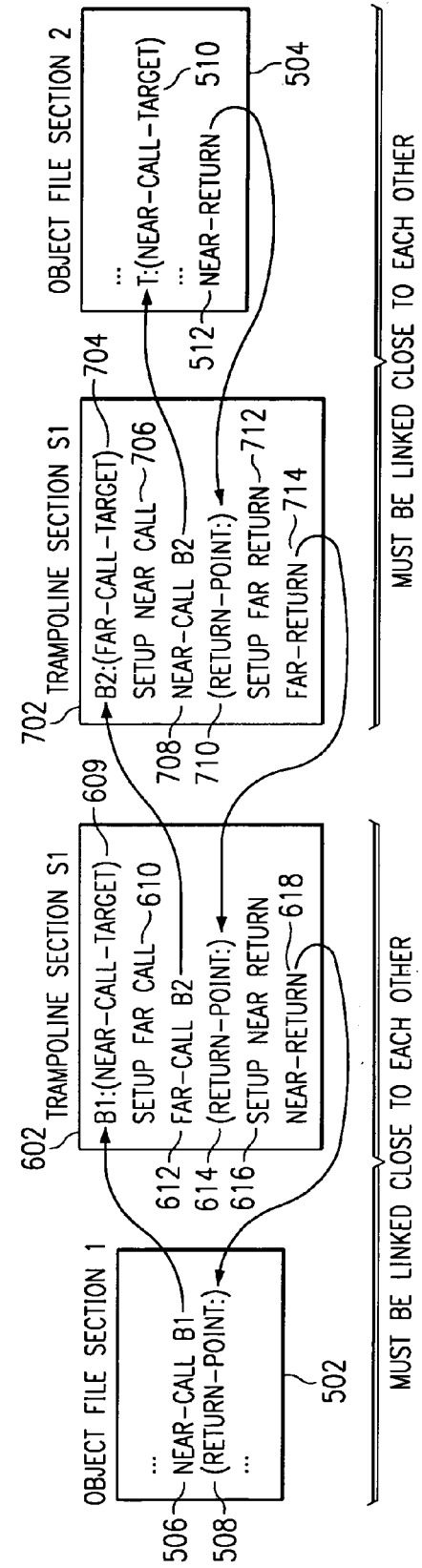
FIG. 7
FIG. 8

METHOD AND SYSTEM FOR FAR BRANCH AND CALL INSTRUCTIONS

This application claims the benefit of provisional application Ser. No. 60/158,248 filed Oct. 8, 1999.

TECHNICAL FIELD OF THE INVENTION

The present invention relates to software development tools, and, more particularly, to software program linking and methods.

BACKGROUND OF THE INVENTION

Software is constructed in pieces. Source code is expressed in a language, such as "C" or assembly, and is organized into multiple text files. Each of these files is processed into a corresponding binary file known as an object file by a compiler and/or an assembler. A linker combines the object files into a single file. The linked output file may be a complete application, and may be executed on a particular target hardware system. Alternatively, the output may be a partial link such that it is used as an ingredient in a subsequent link.

To perform the linking process, the linker is given a list of ingredient object files, a description of the hardware and directions on how to combine and place the ingredients into the memories. The ingredient files are composed of "sections". Each section contains code or data to be placed into the memories. During this process, different sections of the compiled application are assigned to various memories of the target hardware system. Embedded systems, such as digital signal processors ("DSPs"), have a plurality of memory types with different sizes, speeds and other characteristics. The allocation of memory to the different pieces of application code and data to the different locations in memory affects the performance of the application after it is embedded onto the hardware system.

Referring to FIG. 1, a software development system 100 is depicted. As described above, text files 102 and 103 are source code written by a programmer. Text files 102 and 103 may represent a plurality of text files. Compiler 104 translates the source code in text files 102 into assembly language source code. Text files 103 represent assembly language source code files written manually. Assembler 106 translates the assembly language source files from compiler 104 or a programmer. Machine language object files 108 are outputted from assembler 106. Object files 108 may be known as object programs or object modules. As described above, object files 108 are the corresponding binary files to text files 102 and 103, either alone or in combination.

Linker 110 combines object files 108 into a single executable object module, or output file 114. In addition to object files 108, linker 110 accepts library files 112 containing multiple object files. Linker 110 also allows for the combination of object file sections, binds sections or symbols to addresses within memory ranges, and defines or redefines global symbols. After linking operations are completed, output file 114 is downloaded to processor 116. Thus, linker 110 places object files 108 in memory on processor 116 as output file, or output program, 114.

FIG. 2A depicts a known linker within a software development system 200. Linker 110 is given a list of object files 108, a description of the computer hardware memory, and directions on how to combine and place object files 108 in linker commands 206.

Linker allocation directions in linker commands 206 are expressed in a custom text-based command language requiring extensive study and documentation. A user inputs and edits linking instructions in text editor 204. Text editor 204 writes the instructions into command file 206 to be inputted into linker 110. The user studies the textual linker output in map file 208 and errors 210 for the results of the linking instructions and makes any necessary changes to the command file 206. This process is repeated until the desired results are obtained. Linker 110 receives object files 108 and library files 112. Using command file 206, linker 110 links ingredients 208 according the linking instructions to separate output file 114. As described above, output file 114 may be an executable application.

FIG. 2B depicts a flowchart of a known method for performing linking operations using a known linker. Step 221 executes by starting the linking operations in linker 110. Step 222 executes by linker 110 reading ingredient files and commands, such as object files 108, libraries 112 and linker commands 206. Step 224 executes by linker 110 allocating the sections, or blocks, of code and data to memories within the target hardware computer system. Linker 110 uses the instructions written in linker commands 206 to allocate the sections. Step 225 executes by defining symbols with the sections of the ingredient files. Some symbols represent call or branch destinations within a section of code. Other symbols represent individual variable locations within a section of data. As the sections are located at a specified address in a memory, the symbols within the placed sections inherit specific addresses and are said to be "defined."

Step 226 executes by determining whether all referenced symbols have been defined by linker 110. If no, then step 230 executes by issuing an error signal or message. If yes, then step 228 executes by determining whether the sections of code and data fit in the target memories. If no, then step 230 executes by issuing an error signal or message as a problem has arisen that must be resolved. If yes, then step 240 executes by relocating symbolic references in the allocated sections of code or data. Step 242 executes by writing output file 114 and link map file 208 for review by a user.

Step 232 executes by denoting a failure has occurred in the linking operations. Step 232 may execute subsequent to the error message in step 230. Step 244 executes by denoting the linking operations have been successful.

FIG. 3 depicts a known linker allocating object files to a memory. Linker 110 includes allocation module 316 and output module 318. Ingredient 300, or object file A, includes sections A1, A2, and A3. Ingredient 302, or object file B, includes sections B1 and B2. Ingredient 304, or object file C, includes section C1. The sections represent blocks of code or data. Object files A, B, and C may be object files within an application.

Allocation module 316 inputs linker commands 206. Linker commands 206 are a set of instructions that tell allocation module 316 where to place the sections of object files A, B, and C in the target computer hardware memories. Memories 312 and 314 represent memory devices within the target system. Memories 312 and 314 have different locations and addresses within the address space of the target system. Using the linking instructions, allocation module 316 places each section within the ingredients into a memory device. For example, allocation module 316 places section A1 of object file A in memory 312 at a specified location. Allocation module also places section B1 of object file B in memory 312 at another location, different from the location of section A1.

Allocation module 316 also resolves any issues regarding symbolic references within the sections of the object files. Sections may have calls, or branches, to subroutines in other sections within the object files, or even to other object files. These calls are represented by symbol references within the code. As the sections of code are linked within memories 312 and 314, the symbolic references to symbols within these sections are replaced by address locations within the memory.

Referring to FIG. 4, a linker symbol resolution system is depicted. Ingredients 420 include object files having a plurality of sections of code, including sections 400 and 405. Section 400 includes a code block 402 that contains a definition of a branch label A. Code block 402 also includes other information. Section 400 also includes a symbol dictionary block 404 that lists symbol A as being defined in section 400, and has an offset of 20 from the origin of code block 402.

Section 405 includes a code block 406 and a symbol dictionary block 408, similar to section 400. In code block 406, a branch instruction lists branch label A as its target. Symbol dictionary block 408 lists symbol A as being a reference to a definition elsewhere without a known offset as section 400 has not been allocated to a memory location.

During the allocation phase of allocation module 316 in FIG. 3, linker allocation decision module 422 allocates sections 400 and 405 of ingredients 420 to specific addresses in the target computer hardware memory. Linked output file 424 includes allocated sections 410 and 411 that correspond to section 400 and 405, respectively. Branch target 412, or label A, is located within allocated section 410. Further, branch instruction, or call, 414 to label A is located within allocated section 411. Branch instruction 414 is known as a symbol reference within allocated section 411.

The base, or beginning, addresses of sections 400 and 405 are recorded in table block 423 inside linker 110. For example, the base address of section 410 is memory address 2000. Referring to symbol dictionary block 404, symbol A has an offset of 20 from the base address. Thus, branch target 412, or label A, is located at address 2020 within the memory.

During the relocation and output steps of the linking operations, all symbol references 414 are replaced by actual addresses computed by adding the symbol offsets in the symbol dictionaries to the section base addresses in table block 423. These addresses are inserted into the linked code, such as symbol reference 414. Thus, the symbol references are replaced by address locations by linker 110.

Referring back to FIG. 3, after allocation module 316 completes the allocation of the sections of object files A, B, and C, then output module 318 links the sections within the memories to generate output file 114 that represents an application to be run on a target computer system.

The linking process involves a preparation period for a user to resolve any errors with the linking process, as described in step 230 of FIG. 2B. Known linkers report errors and may fail to complete the allocation of the ingredients object files if there are unresolved symbolic references. Thus, if the list of input object files and libraries is not complete, then an error occurs within the linking process. The user then re-edits command file 206 to improve or adjust the linking instructions. This activity inhibits interactive allocation strategies in which a user attempts to optimize the allocation of only a part of the ingredients of the software program before the remaining parts of the program are available or written. No links may be left incomplete. Therefore, extensive experimentation is prohibited and users are discouraged from finding more optimal ways of linking.

Attempts to reduce development time for the linking instructions include tools that dialogue with the user, and write linker instruction command files for the user. These tools are appropriate for simple applications, but may not be able to adequately optimize complex applications or memories. Another attempt includes a visual link map analyzer that uses visual input to edit a linker instruction command file, and runs the command file through the linker. The analyzer displays the linker map file 208. These systems, however, include two separate programs, a traditional linker and a visual analyzer. These programs maintain separate models of the link in order to perform their respective tasks.

Further, known linkers are unable to resolve incomplete links. Referring back to FIG. 2B, all sections must fit in memories before an output file may be created or the symbol references resolved. This requirement inhibits interactive linking strategies as all links must be complete before an map file is generated for review by the user.

As software applications evolve, the ingredients change as do the sizes and the properties of the individual ingredient object files 108. The instructions in command file 206 for allocation of a target system memory may become obsolete periodically and require maintenance. Directions are updated to interface with new hardware target system memories.

In many instances, it is the user's responsibility to understand all component specifications and requirements and to reflect them in text-based linker command file 206. The user combines these constraints in generating the linking instructions with text editor 204. For updates, the user manually merges linker command file 206 into a bigger command file each time.

Linking operations impact performance on embedded processors, such as digital signal processors. Unlike general purpose processors having a single, large memory, embedded processors have many different memories. The layout of the application into various target memories impacts performance. Certain kinds of fast memory, such as on-chip memory, are limited in space and desired for critical application functions. Trade-offs are made depending on the size of the programmer's application plus any third party components and libraries. As the program evolves and grows, the allocation decisions are revised in a time-consuming manner.

New software development tools that build applications from large, predefined components are available. The tools attempt to manage the linking process, but are hindered by having to write commands 206 and by having to parse map files 208, and error files 210, that intended for humans.

Many linking operations result in "near-branch" and "far-branch" instructions. Linking operations also result in "near-call" and "far-call" instructions. A branch is a one way instruction, while a call is a branch and return instruction. Calls typically are used in conjunction with subroutines. Known computer architectures employ both types of instructions. A near-branch or near-call instruction, or near branch, is capable of transferring program control a limited distance from the address of the branch instruction to the target address. A far-branch or far-call instruction, or far branch, is capable of transferring program control a greater distance to a target address. The far branch, however, requires more memory space and is slower than a near branch. The far branch takes more bits to designate the remote location and going to that remote location takes more time. For a call the word call would take 8 bits and the location for a far call would take more than 8 bits. A target address may have many branches that reference it from inside and outside the section or block of code. An "external branch" and a "global target" identify a branch and target address in different object code sections. In addition, these terms may be referred to as "external call" and "global subroutine" in branch and return applications.

Because of the lower memory requirements and higher speed, near branches are preferred over far branches. Generally, the distance between an external branch and its target address is not known until the linker places the sections in memory. This step is after the compiler has generated the branch code. If a near branch is generated where a far branch is needed, the object code does not run correctly and may require modification. One modification is to recompile or reassemble the source code using correctly-sized branches. Few compilers and linkers, however, provide for communication of actual branch distances from the linker to the compiler. A common practice is to direct the compiler to generate only far branches. This practice is inefficient. Another common practice is to annotate source code to specify particular near and far branches. This practice results in a long term maintenance problem as the software program evolves and branch distances change. It also is time-consuming.

One attempt to resolve these issues is described in U.S. Pat. No. 5,740,447, herein incorporated by reference. The method described in the patent calls for the linker to change near branches to far branches, and vice versa. Depending on the computer architecture, this method may require the linker to substitute different branch instructions of possibly different sizes, and possibly to insert additional instructions. Requiring additional instructions is notable because some computer architectures require the use of a register in order to load an address for a far branch. Therefore, when a near branch is produced by the compiler, a free register may not be available to use for the new far branch inserted by the linker. Further, it may be necessary to change near-return instructions to far-return instructions if the original branch is actually a subroutine call instruction.

Two deficiencies may exist in the method of link-time fix-up. First, it may be difficult to implement the method in a linker because changing a branch may cause other changes to ripple throughout the object file as its size changes. Specifically, analyzing object code to locate a free register may be quite difficult. Second, the modified object code may be less efficient than the object code produced by the new method. The inefficiency arises by changing several near branches sharing a single target to far branches requiring additional memory space than the new method. In addition, if the compiler reserves a register in order to simplify potential link-time fix-ups, then the overall object code efficiency may suffer by not having the register available.

SUMMARY OF THE INVENTION

From the foregoing it may be appreciated that a need has arisen for a system and method for an interactive visual linker that may be controlled either by humans or software components. In accordance with one embodiment of the present invention, a method and system for a visual linker is provided that substantially eliminates and reduces the disadvantages and problems associated with conventional linkers in software development systems.

The method involves the link-time modification of object code generated by the compiler or assembler, and the addition of custom-generated object code to the link, for the purpose of implementing "far branches".

The present invention implements and results in space savings depending on particular characteristics of the object code.

Compilers and assemblers generate near-branch or near-call instructions for all external branches or external calls, respectively. (Hereafter we refer only to calls but the same applies to branches.) The linker analyzes each external call. If the target is too distant from the call, the linker redirects the near call to new "trampoline code" which then performs a far call to the original target. The original return will return control to the trampoline, which in turn returns to the original call. Special care is taken to be sure the processor state, including call stack, registers, arguments, etc., appear to the final target to be exactly as if a near call had been made from the original call site.

This single-trampoline modification may fail to work if any of certain conditions exist, including: the need to use resources such as registers to prepare for a far call; the need to use different entry points for near and far calls; or any other condition in which a far call to the original call target cannot be made in a way that mimics a near call from the original caller. In these cases, a two-trampoline solution is needed.

For the two-trampoline solution, the linker creates two trampolines; the first trampoline is linked close to the original call, and the second trampoline is linked close to the original target. The original near call is changed to point to the first trampoline; the first trampoline performs a far call to the second trampoline; and the second trampoline performs a near call to the original target. Special care is taken to be sure the processor state, including call stack, registers, arguments, etc., appear to the final target to be exactly as if a near call had been made from the original call site.

When there are several branches to the same target, the linker attempts to share the same trampoline code to save space.

The present invention allows a user, software program, or component via commands, gestures, and application programming interfaces ("API") to specify a link in an incomplete fashion. During such incremental specification, the link may be incomplete. Ingredient object files need not be complete. Nor do all sections from each object file need to be placed into memory. Symbolic references need not be resolved.

With reference to the incomplete link, the visual linker of the present invention communicates to the user via visual or graphical displays without producing errors or other procedures to prevent further linking operations. This feedback includes the allocated position and size of the sections that are allocated to memory, the values of symbols that are allocated, a list of symbolic references that are not defined, and a list of ingredient object files and sections that are not allocated. Thus, the user receives real-time feedback on the results of the linking operations even if not all object files and sections are allocated to a location in memory. Therefore, the user may select or experiment with linking instructions without the need for verification.

Further, the user may complete incrementally an incomplete link by a plurality of commands, either alone or in combination. The commands include adding or removing ingredient object files or code sections to be included in the linking operations. The commands also include specifying the sections from the ingredient files that are to be allocated. The commands also include de-allocating or reallocating sections previously allocated. The commands also include specifying a memory area that certain sections or various kinds of sections are to be allocated. The commands also include specifying constraints on the allocation of certain sections and object files, such as specifying absolute addresses for sections or symbols, or specifying alignment constraints on addresses for sections or symbols. The commands also include specifying the order that sections and object files are allocated. The commands also include defining new symbols that are referenced by object files during linking operations. The commands also include specifying characteristics of the allocation strategy, such as specifying those sections that are not referenced by other sections that may be included in the linking operations.

The present invention also includes a link server API that allows other client software programs or program components to participate in the link process. The link server provides continues feedback to the client programs or components and this enables the programs or components to monitor and react to the incomplete link described above. The client program or component may issue a plurality of commands through the API, either alone or in combination, to the link server. The commands include adding or removing ingredient object files or code sections to be included in the linking operations. The commands also include specifying the sections from the ingredient files that are to be allocated. The commands also include de-allocating or real-locating sections previously allocated. The commands also include specifying a memory area that certain sections or various kinds of sections are to be allocated. The commands also include specifying constraints on the allocation of certain sections and object files, such as specifying absolute addresses for sections or symbols, or specifying alignment constraints on addresses for sections or symbols. The commands also include specifying the order that sections and object files are allocated. The commands also include defining new symbols that are referenced by object files during linking operations. The commands also include specifying characteristics of the allocation strategy, such as specifying those sections that are not referenced by other sections that may be included in the linking operations.

The link server provides continuous feedback from the linking operations. Feedback is information passed from the linking operations back to the client software program or component so that the program or component may perform additional operations. Via the link server, the client software program or component may determine the address assigned to a section or symbol during linking operations. The program or component may determine the length of a section. The program or component may determine whether any section is not allocated as specified. The program or component may determine whether any control action succeeded or failed. Further, the interface between the link server and other software programs or components allows more than one program or component to simultaneously control and/or receive feedback during linking operations.

The present invention also includes a link server that receives commands or gestures from an input device and translates the commands or gestures into linking instructions within a linking recipe. The commands or gestures include drag and drop commands, and menu commands using a mouse. The link server allows the steps of the linking recipe to be replayed, without user interaction, to obtain a similar effect as the sequence of commands or gestures. The linker also allows the steps of the recipe to be viewed and individually changed. The linker also allows the steps of the recipe to be imported into other recipes to perform part or all of a linking process.

During the process of creating the steps, the link server generalizes the gestures or commands. Thus, a consecutive series of commands or gestures that result in moving each section of a particular kind to a particular memory area is generalized to a single step that moves all sections of the particular kind to the particular memory area. Further, a command or gesture that moves each section currently referenced by a particular section is generalized to a single step that moves any sections referenced by the particular section. Moreover, a command or gesture that moves each section from a particular object file is generalized to a single step that moves all section from the particular object file.

A technical advantage of the present invention is that a visual linker is provided. Another technical advantage of the present invention is that a visual linker is portable and compatible with multiple target embedded memory systems.

Another technical advantage of the present invention is that the visual linker interacts with other software tools and wizards. Another technical advantage of the present invention is that the visual linker builds a linking strategy amongst mixed multiprocessor systems.

Another technical advantage of the present invention is that the visual linker allows a user to view visual and graphical memory layouts while adjusting memory allocations. Another technical advantage of the present invention is that the visual linker may be a stand-alone software tool. Another technical advantage of the present invention is that the visual linker has plug-and-play capability.

Another technical advantage of the present invention is that the time to develop linking process instructions and strategies is reduced. Another technical advantage of the present invention is that training requirements are minimized and training time is reduced. Another technical advantage of the present invention is that a visual linker is provided with increased functionality. Another technical advantage of the present invention is that the visual linker allocates blocks of code to embedded memory machines without running confidence check programs and in reduced time.

BRIEF DESCRIPTION OF THE DRAWINGS

For a more complete understanding of the present invention, and the advantages thereof, reference is now made to the following descriptions taken in connection with the accompanying drawings, in which:

FIG. 3 illustrates a software development system in accordance with an embodiment of the present invention.

FIG. 4 illustrates a software development system in accordance with another embodiment of the present invention.

FIG. 6 illustrates object code generated by a compiler for two object sections in accordance with an embodiment of the present invention.

FIG. 7 illustrates modified object code generated when a first section and a second are too far apart to permit a near call in accordance with an embodiment of the present invention.

FIG. 8 illustrates modified code generated when two trampolines are desired in accordance with an embodiment of the present invention.

DETAILED DESCRIPTION OF THE INVENTION

An embodiment of the present invention and its advantages are best understood by referring now in more detail to FIGS. 5–12 of the drawings, in which like numerals refer to like parts. A description of a visual linker using the present invention is further described in provisional U.S. Patent application Ser. No. 60/158,249 filed Oct. 8, 1999 and non-provisional application serial no. filed of L. Szewerenko et.al entitled "Method and System for Visual Linker" incorporated herein by reference. FIGS. 5–12 illustrate a visual linker for far branch and call instructions in accordance with one embodiment of the present invention.

Figure 1:
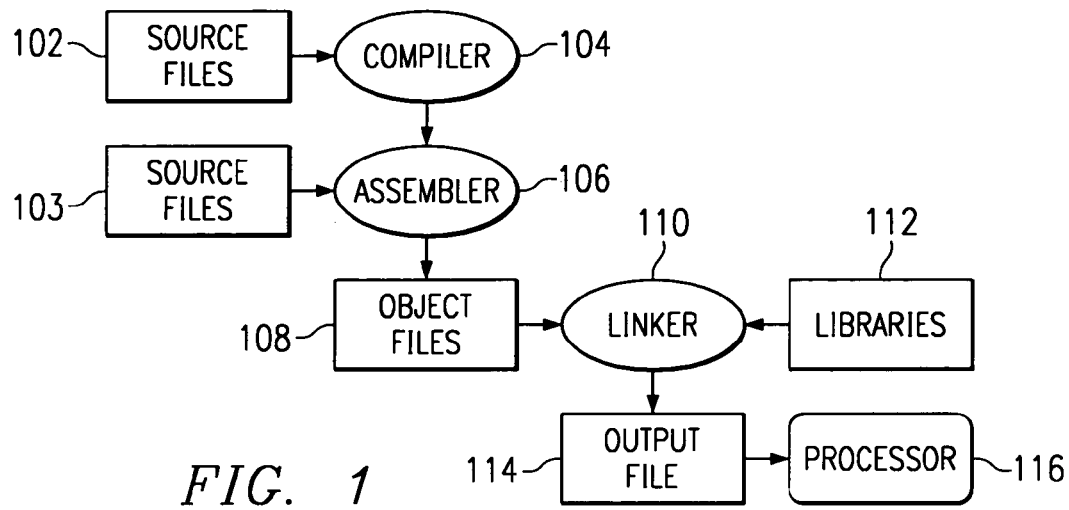
FIG. 1 illustrates a known software development system.
Figure 2A:
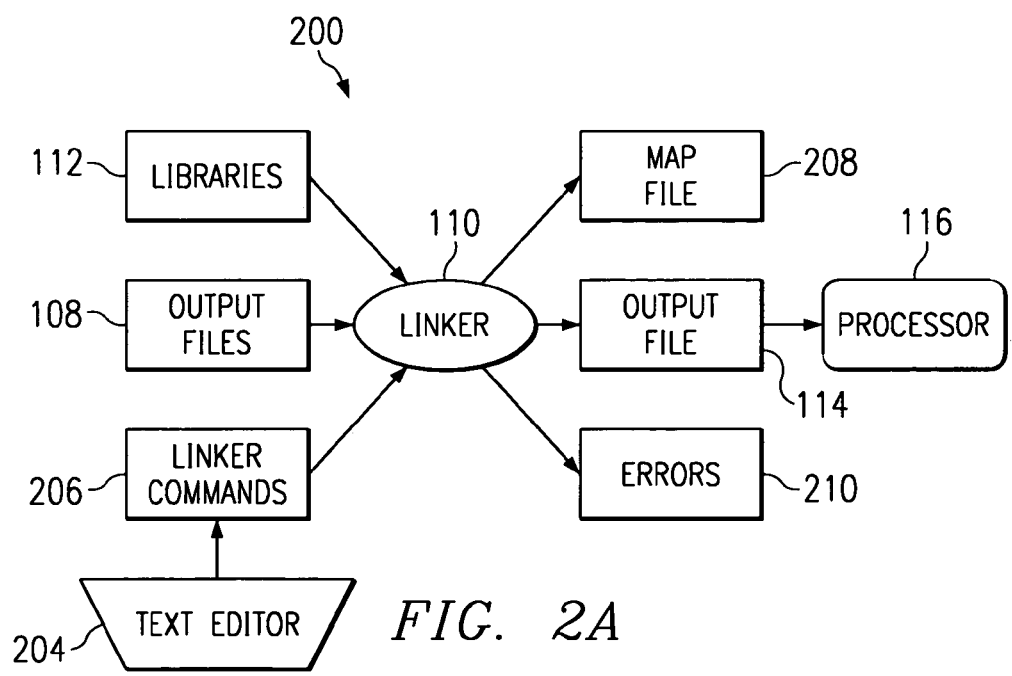
FIG. 2 illustrates a known linker.
Figure 2B:
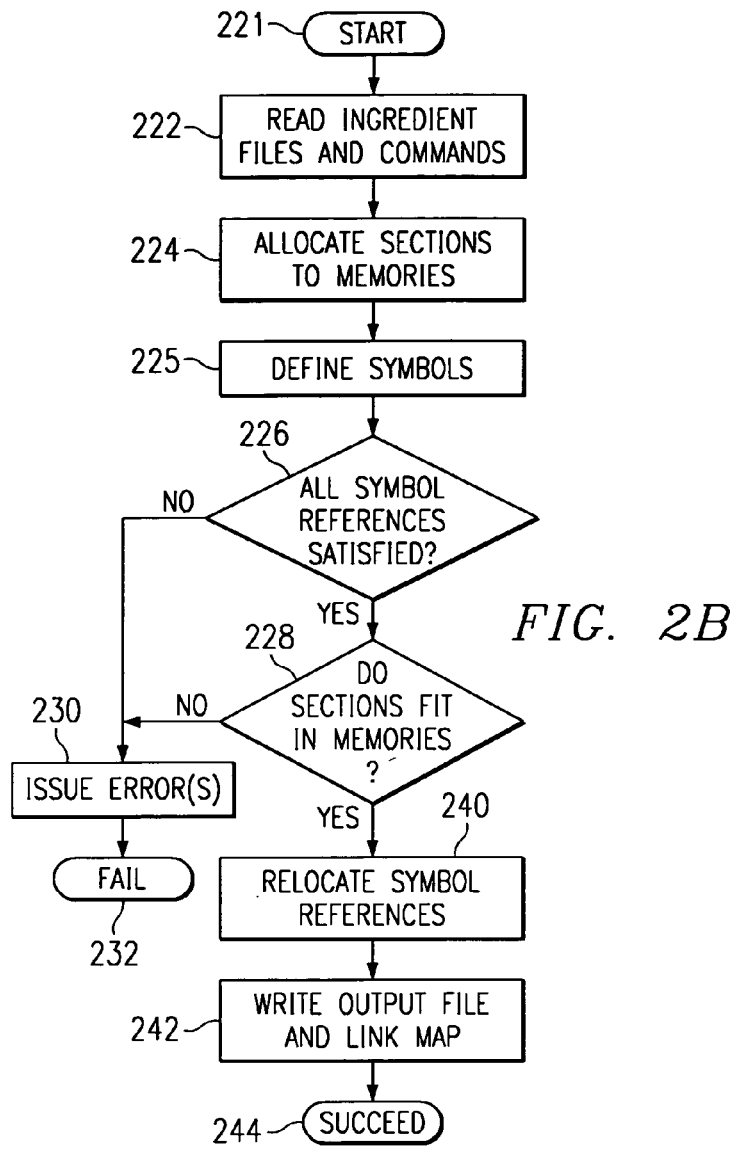
Figure 5:
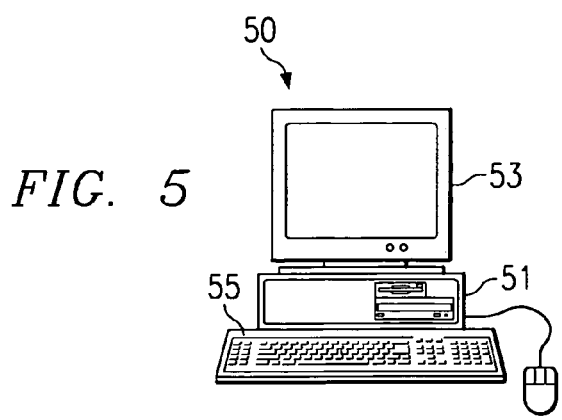
FIG. 5 illustrates a workstation as used in the present invention.

As discussed in the linker of the referenced application the hardware system includes a computer workstation 50 with a processor 51, a display with screen 53, a keyboard 55 and a mouse 57 as illustrated in FIG. 5. The workstation includes a GUI interface with a drag and drop program where the ingredients or object files and libraries are dragged and dropped (allocated) to memory locations. When the command is for a branch or a call instruction the linker analyses each branch or call and if the target location is for an address that too distant from the branch or call location, the linker of the present invention redirects the near call to a new custom generated object code or "trampoline code" for implementing the "far branches or calls". This new custom generated code or "trampoline code can when not too far perform the far call to the original target. When a call the original return will return control to the trampoline, which in turn returns to the original call.

FIG. 6 shows the object code generated by the compiler for two object sections, the first of which contains a call to a subroutine in the second section. The first section 502 contains a near call 506 to a subroutine target T 510 in the second section 504. Code generated by the compiler for the second section 504 expects that a near call 506 will be used to reach target T 510, and the code generated for subroutine T includes a near return 512 that will return to the point 508 just after the original call 506. This code will operate correctly if sections 502 and 504 are linked close enough together to allow the near call.

FIG. 7 shows the modified object code generated when the first section 502 and the second section 504 are too far apart to permit a near call. The linker generates a new trampoline section 602 which is linked closely to section 502. Within section 602, the linker generates a subroutine B1 609. The linker modifies the original near call 506 to point to target B1 609. The subroutine B1 may include code 610 to prepare for a far call; it performs a far call 612 to target T 510 in section 504. When subroutine T 510 completes, the return instruction 512 returns control to 614, which may include code 616 to prepare for the near return 618; it performs the near return 618 to the original return point 508. The setup code 610 and 616 may not be necessary in some computer architectures. The code could be for example to form a register: B. Trampoline_out-Push R0 to register R0 to save into memory; R0=B trampoline to cause it to trampoline to target B. The reverse code of PoP R0 and branch to B is done to return.

The single-trampoline may not work in certain conditions such as: the need to use resources such as registers to prepare for a far call; the need to use different entry points for near and far calls; or other conditions in which a far call to the original call target cannot be made in a way that mimics a near call from the original caller. In these cases a two-trampoline solution is needed.

For the two-trampoline solution, the linker creates two trampolines wherein the first trampoline is linked close to the original call and the second trampoline is linked close to the original target. The original near call is changes to point to the first trampoline; the first trampoline performs a far call to the second trampoline; and the second trampoline performs a near call to the original target.

FIG. 8 shows the modified code generated when two trampolines are necessary. A first trampoline 602 is constructed as in FIG. 7. A second trampoline section 702 is created and linked close to section 504. The second trampoline 702 contains a subroutine B2 704. The linker modifies the original call 506 to reference B1 609 in the first trampoline. Subroutine B1 in the first trampoline far-calls 612 to subroutine B2 704 in the second trampoline. Subroutine B2 near-calls 708 to the original target 510. When the original target performs near return 512, control returns to the second trampoline at 710. The second trampoline far-returns 714 to the first trampoline 614. The first trampoline near-returns 618 to the original return point 508. The first trampoline 602 may contain code 610 to set up its far call and may contain code 616 to set up its near return. The second trampoline 702 may contain code 706 to set up its near call and may contain code 712 to set up its far return. Special care is taken to be sure the processor state, including call stack, registers, arguments, etc., appear to the final target to be exactly as if a near call had been made from the original call site.

The trampolines necessary to implement one-way branches instead of calls is an simplification of the cases shown. The call instructions 506 in section 502, 612 in section 602, and 708 in section 702 are replaced by one-way branches. The following lines of code in the figures do not exist in the one-way branch case: 508 in the first section 502; 512 in the second section 504; 614, 161, and 618 in the first trampoline section 602; and lines 710, 712, and 714 in the second trampoline section 702. When there are several branches to the same target, the linker attempts to share the same trampoline code to save space.

Figure 9:
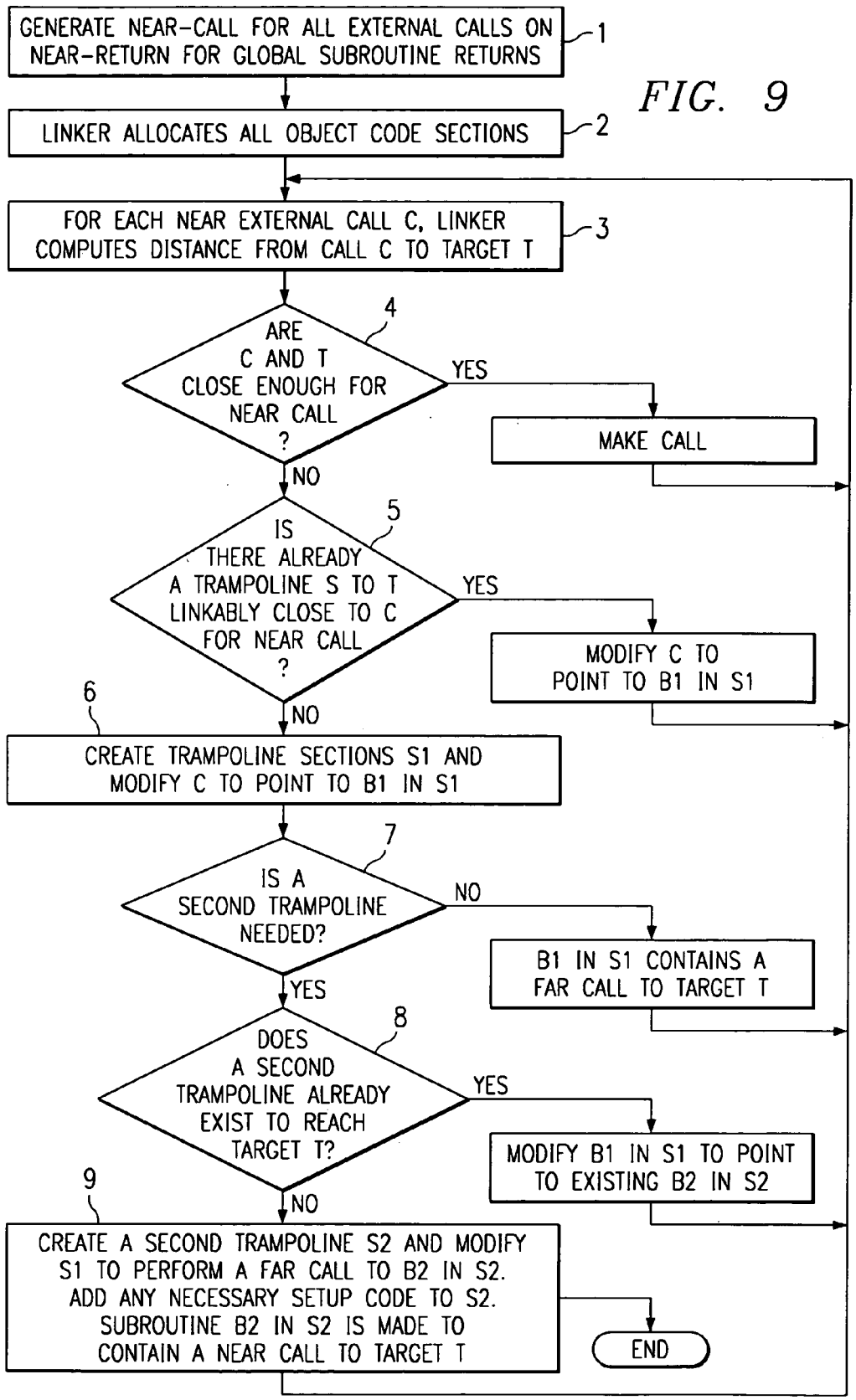
FIG. 9 illustrates a flow chart of the operation of the system according to one embodiment of the present invention.

The detailed logic used to determine when and how to create trampolines is as follows and illustrated by the flow chart of FIG. 9, given a near call C in one section that references a target T in a second section. This algorithm is used for each such call in the program being linked. (The same symbol names are used as in FIGS. 6 and 7.)

1. The compiler or assembler generates near-call instructions for all external calls, and near-return instructions for all global subroutine returns, ignoring link-time layout of sections. (The compiler or assembler may also generate far calls, but far calls need not be modified by the linker.)
2. The linker allocates all object code sections, with no need to take into account the limitations of near-branch instructions.
3. For each near external call C, the linker computes the distance from C to its target T and performs the following steps.

4. Are the C and T allocated close enough to each other to permit a near call? If so, then C can near-call T directly and no modification is necessary; return to step 3 to consider the next call.
5. Otherwise, is there already a trampoline S1 to target T that is linkably close enough to C to permit a near call? If so, then modify C to point to B1 in S1 and return to step 3 to consider the next call.
6. Otherwise, create trampoline section S1 and modify C to point to B1 in S1. Add any necessary setup code to S1. Continue with following steps.
7. Is a second trampoline S2 needed to reach T? If not, then B1 in S1 should contain a far call to T, and return to step 3 to consider the next call.
8. Otherwise, does a second trampoline S2 already exist to reach T? If so, then modify B1 in S1 to point to existing B2 in existing S2, and return to step 3 to consider the next call.
9. Otherwise, create second trampoline S2 and modify S1 to perform a far call to B2 in S2. Add any necessary setup code to S2. Subroutine B2 in S2 is made to contain a near call to T. Return to step 3 to consider the next call.

Figure 10A:
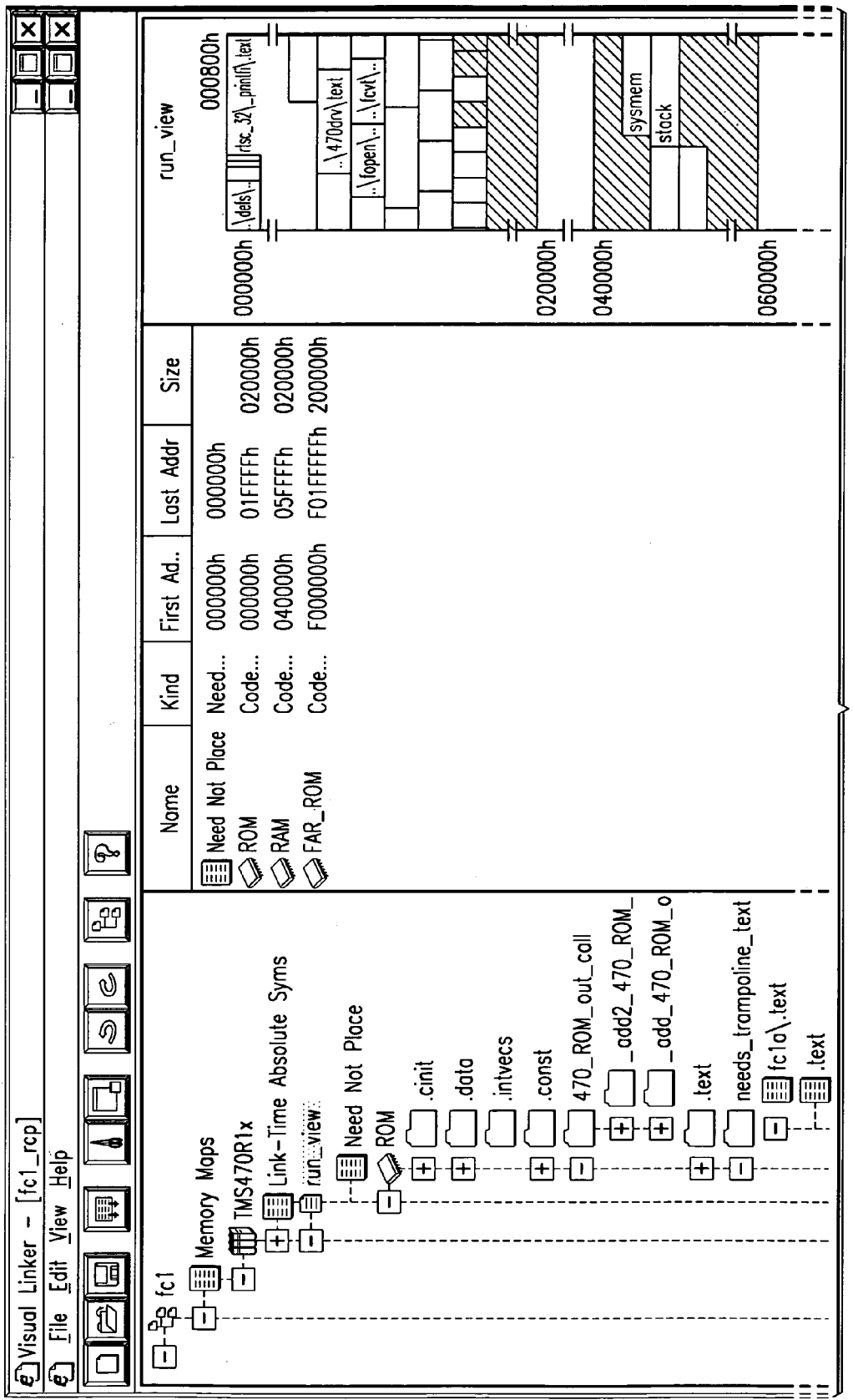
FIG. 10a illustrates a visual linker screen view of two trampolines.
Figure 10B:
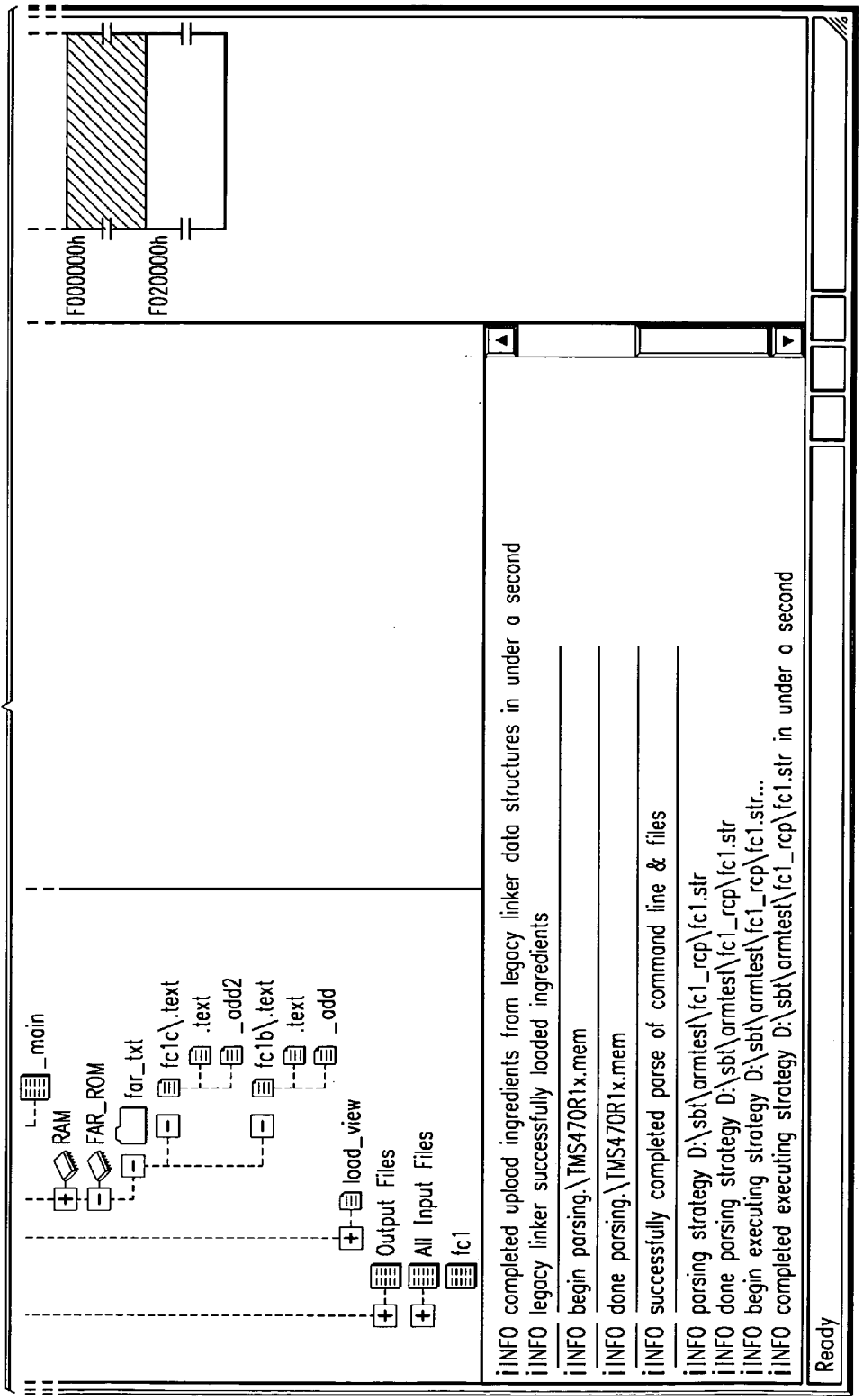
Figure 11A:
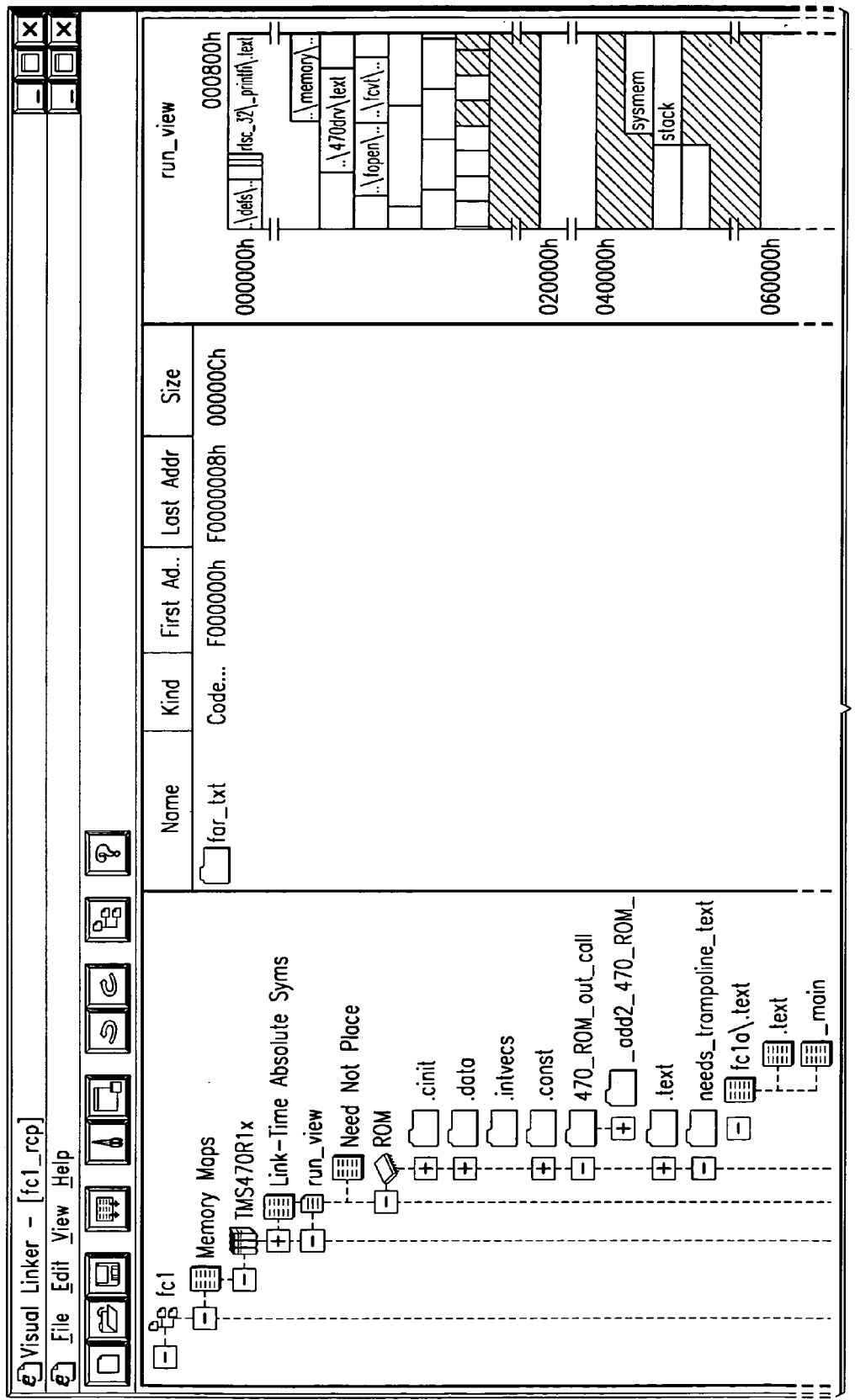
FIG. 11 illustrates a visual linker screen view with one trampoline removed because the object file moved closer to the call location.
Figure 11B:
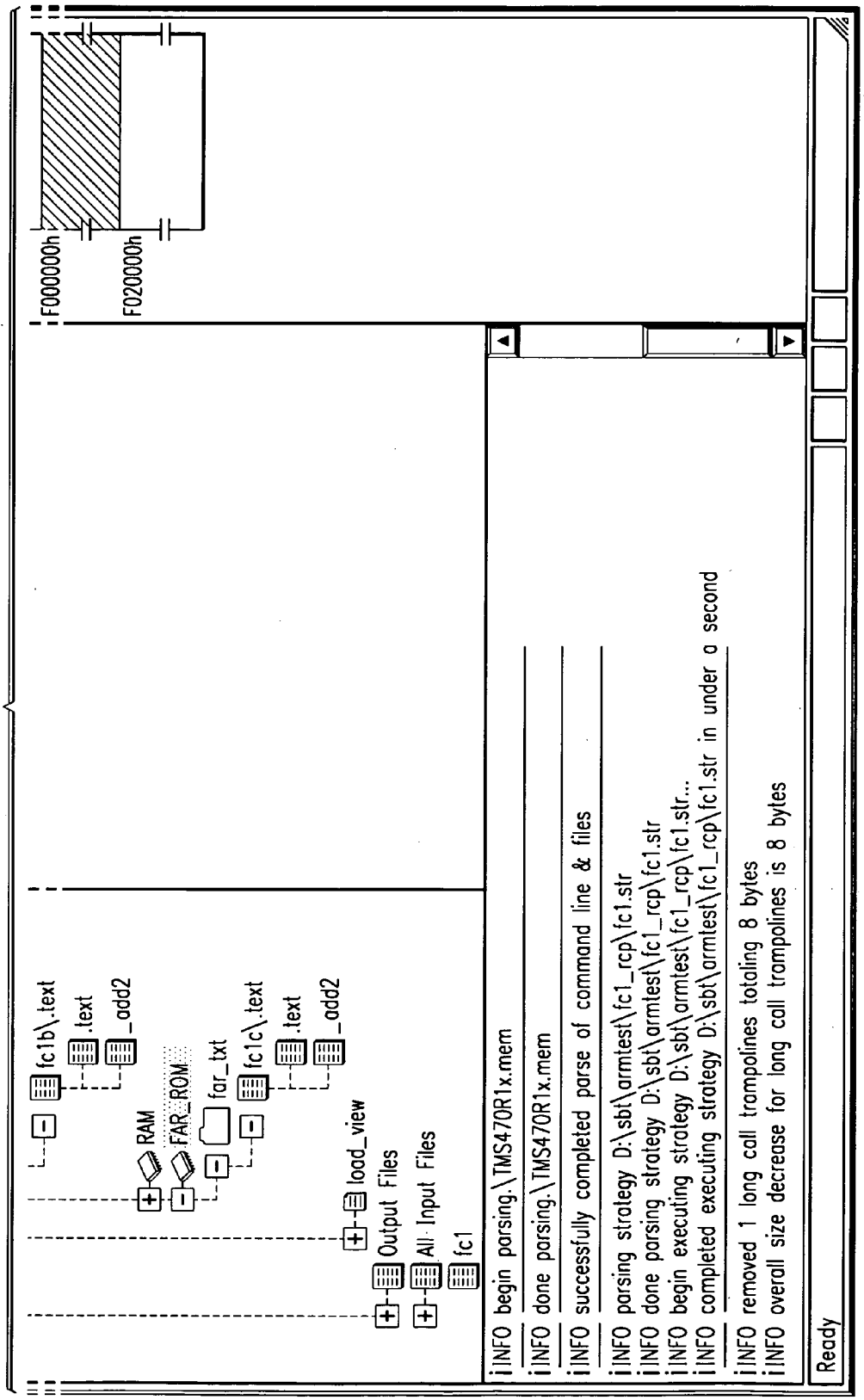
Figure 12A:
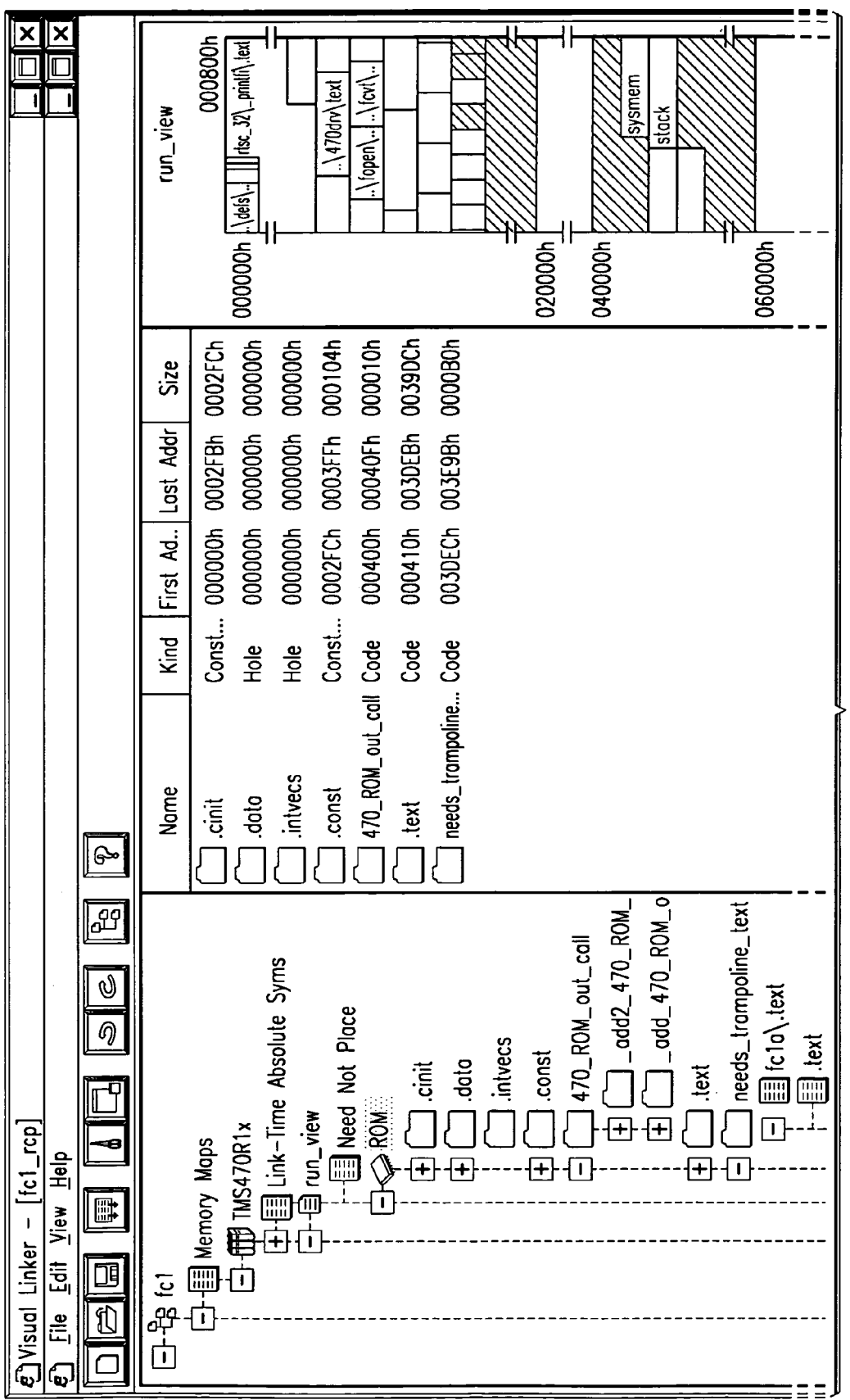
FIG. 12 illustrates a visual linker creating a trampoline when the memory location is moved far away.
Figure 12B:
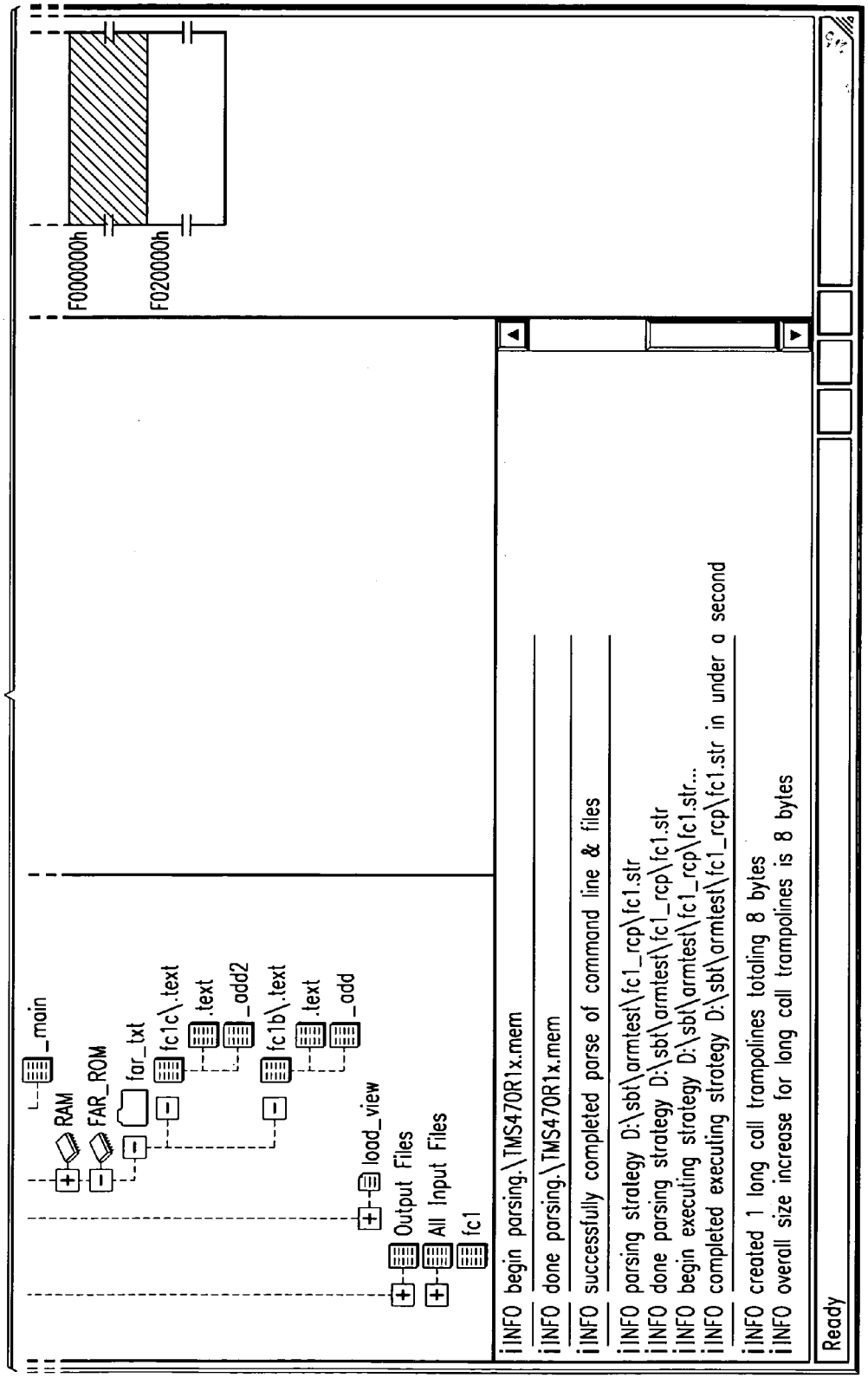

FIG. 10 illustrates a screen view of the visual linker where the let window illustrates a run view of the memory map. The "add_470_RAM_out_calls" are trampolines in there own folders. The center screen lists addresses to FAR_ROM and right screen the address locations. FIG. 11 illustrates only one trampoline since fclb is moved closer to main. The system automatically adjusts when the locations are changes. FIG. 12 illustrates when the fclb is moved back that the system needs to generate a trampoline.

The present invention fixes link time problems that occur at link time because of link time decisions. This is done without reverse engineering around calls. There is no need for changing source code for the linker can take care of it's own problems. There is also provided sharing of trampolines to reduce growth. There is also provided a sequence to preserve recovery.

Thus, it is apparent that there has been provided, in accordance with an embodiment of the present invention, a visual linker that satisfies the advantages set forth above. Although the present invention has been described in detail, it should be understood that various changes, substitutions, and alterations may be made herein. Other examples are readily ascertainable by one skilled in the art and may be made without departing from the spirit and scope of the present invention as defined by the following claims.

What is claimed is:

1. A method of making an original far call or far branch instruction to a target address using a near call or near branch instruction that is capable of only the transfer of program control a limited distance from address of the near call or branch instruction to the target address comprising the steps of: determining if a transfer of control is beyond said limited distance for said near call or near branch instruction, and, if so, generating a link time modification of object code by a compiler or assembler and by the addition of custom generated object code or trampoline code to the link time object code, without changing the compiler generated instructions or expanding compiler generated object code, for a long distance transfer of control by redirecting the original far call or branch instruction to a code which will transfer control to the target address and wherein if resources are a problem a step of using a sequence of trampolines with trampoline codes is further included.

2. A method of branch or call instructions comprising the steps of: the compiler or assembler generating near-call instructions for all external calls, and near-return instructions for all global subroutine returns, ignoring link-time layout of sections; the linker allocating all object code sections, with no need to take into account the limitations of near-branch instructions; for each near external call C, the linker computing the distance from C to its target T and performing the following steps: determining if the call C and target T are allocated close enough to each other to permit a near call and if so, then call C performs a near call to target T directly with no modification and return to consider the next call; otherwise if there is there already a trampoline S1 to target T that is linkably close enough to call C to permit a near call, then modifying call C to point to call B1 in S1 and returning to consider the next call; otherwise, creating trampoline section S1 and modifying call C to point to call B1 in S1 and add any necessary setup code to S1 and continue with following steps of determining if a second trampoline S2 is needed to reach target T and, if not, then assigning call B1 in S1 to contain a far call to target T, and return to consider the next call; otherwise, determining if a second trampoline S2 already exists to reach target T and if so, then modifying call B1 in S1 to point to existing call B2 in existing S2, and return to consider the next call; otherwise, creating a second trampoline S2 and modifying S1 to perform a far call to call B2 in S2 and add any necessary setup code to S2 and subroutine call B2 in S2 is made to contain a near call to target T and return to consider the next call.

3. A method of making a far call or far branch instruction using a near call or near branch instruction that is capable of only transferring of program control a limited distance from address of a branch instruction to a target address comprising the steps of: computing if the target address is too far distant from the near branch or near call limited distance; if it is too far distant then determining if there already is a trampoline section to the target address and if so redirect the far call or far branch instruction to that trampoline section and if there is not already a trampoline section to the target address then generating a trampoline section to the target address and redirect the near call or branch to the generated trampoline section and wherein if a single trampoline fails to work because of resources, then included are the steps of: generating a second trampoline and generating a far branch or call from said first trampoline to the second trampoline section and generating at the second trampoline section a near call or branch to the target address.

4. The method of claim 3 including the step of returning to an original call by returning the control through the trampoline sections wherein a return is a near return from the target address to the second trampoline, a far return from the second trampoline to the first trampoline, and a near return from the first trampoline to the original call.

5. A method of making an original far call (or far branch) instruction to a target address using a near call (or near branch) instruction that is capable of only the transfer of program control a limited distance from address of the near call (or branch) instruction to the target address comprising the steps of: determining if a transfer of control is beyond said limited distance for said near call (or near branch) instruction, and, if so, generating a link time modification of object code by a compiler (or assembler) and by the addition of custom generated trampoline code to the link time object code for a long distance transfer of control by redirecting the original far call (or branch) instruction to a code which will transfer control to the target address and wherein if resources are a problem a step of using a sequence of trampolines with trampoline codes is further included.

* * * * *